United States Patent
Salehkaleybar et al.

(10) Patent No.: US 11,055,363 B2
(45) Date of Patent: Jul. 6, 2021

(54) METHOD FOR DISTRIBUTED MULTI-CHOICE VOTING/RANKING

(71) Applicants: Saber Salehkaleybar, Tehran (IR); Arsalan Sharifnassab, Tehran (IR); S. Jamaloddin Golestani, Tehran (IR)

(72) Inventors: Saber Salehkaleybar, Tehran (IR); Arsalan Sharifnassab, Tehran (IR); S. Jamaloddin Golestani, Tehran (IR)

( * ) Notice: Subject to any disclaimer, the term of this patent is extended or adjusted under 35 U.S.C. 154(b) by 960 days.

(21) Appl. No.: 15/643,466

(22) Filed: Jul. 6, 2017

(65) Prior Publication Data

US 2017/0308612 A1   Oct. 26, 2017

Related U.S. Application Data

(60) Provisional application No. 62/366,032, filed on Jul. 24, 2016.

(51) Int. Cl.
*H04L 12/715* (2013.01)
*H04L 12/751* (2013.01)
*G06F 16/951* (2019.01)

(52) U.S. Cl.
CPC ........... *G06F 16/951* (2019.01); *H04L 45/02* (2013.01); *H04L 45/46* (2013.01)

(58) Field of Classification Search
CPC .................. H04L 45/02; H04L 45/46
See application file for complete search history.

(56) References Cited

U.S. PATENT DOCUMENTS

| | | | |
|---|---|---|---|
| 7,630,944 B2 | 12/2009 | Rupp et al. | |
| 7,814,064 B2 | 10/2010 | Vingralek | |
| 2002/0129296 A1* | 9/2002 | Kwiat | G06F 11/182 714/10 |
| 2003/0154181 A1* | 8/2003 | Liu | G06K 9/6226 |
| 2009/0265141 A1* | 10/2009 | Aly | H04L 45/20 702/188 |
| 2015/0332336 A1* | 11/2015 | Hong | G06F 16/24578 705/14.66 |
| 2015/0378842 A1* | 12/2015 | Tomlinson | H04L 9/085 380/28 |

FOREIGN PATENT DOCUMENTS

| | | |
|---|---|---|
| CN | 103648083 A | 3/2014 |
| CN | 103841641 A | 6/2014 |
| CN | 103024759 B | 9/2015 |

OTHER PUBLICATIONS https://www.researchgate.net/publication/282962771_Distributed_VotingRanking_with_Optimal_Number_of_States_per_Node 2015 UNK Month.*

(Continued)

*Primary Examiner* — Hosain T Alam
*Assistant Examiner* — Anthony G Gemignani
(74) *Attorney, Agent, or Firm* — Bajwa IP Law Firm; Haris Zaheer Bajwa

(57) ABSTRACT

A method for distributed multi-choice voting/ranking in a network with a plurality of nodes associated to a set of choices is disclosed. The method includes setting a plurality of value sets for a plurality of nodes, setting a plurality of collections of memory sets for the plurality of nodes, and updating the plurality of value sets. In addition, the method includes updating the plurality of collections of memory sets, calculating a majority vote for the set of choices, and calculating a rank set for the set of choices.

19 Claims, 7 Drawing Sheets

(56) References Cited

OTHER PUBLICATIONS

Rachid Guerraoui et al., Consensus in Asynchronous Distributed Systems: A Concise Guided Tour, Distributed Systems, LNCS, 2000, pp. 33-47, 1752.
Dana Angluin et al., A Population Protocol for Binary Signaling Consensus, Available as YALEU/DCS/TR-1527, Aug. 2016.
Arta Babaee and Moez Draief, Distributed Multivalued Consensus, The Computer Journal, vol. 57, No. 8, 2014, 1132-1140.
Dana Angluin et al., A Simple Population Protocol for Fast Robust Approximate Majority, Distributed Computing, vol. 21 (2), pp. 87-102, Jul. 2008.
Florence Bénézit et al., The Distributed Multiple Voting Problem, IEEE Journal of Selected Topics in Signal Processing, vol. 5, No. 4, Aug. 2011.
Lihao Xu and Jehoshua Bruck, Deterministic Voting in Distributed Systems Using Error-Correcting Codes, IEEE Transactions on Parallel and Distributed Systems, vol. 9, No. 8, Aug. 1998.
Kyomin Jung et al., Distributed Ranking in Networks with Limited Memory and Communication, Aug. 2011, Technical Report, MSR-TR-2011-88.
Boaz Patt-Shamir and Marat Teplitsky, The Round Complexity of Distributed Sorting, PODC '11 Proceedings of the 30th annual ACM SIGACT-SIGOPS symposium on Principles of distributed computing, pp. 249-256, San Jose, California, USA—Jun. 6-8, 2011.

\* cited by examiner

METHOD FOR DISTRIBUTED
MULTI-CHOICE VOTING/RANKING

CROSS-REFERENCE TO RELATED APPLICATION

This application claims the benefit of priority from U.S. Provisional Patent Application Ser. No. 62/366,032, filed on Jul. 24, 2016, and entitled "DISTRIBUTED VOTING/RANKING WITH OPTIMAL NUMBER OF STATES," which is incorporated herein by reference in its entirety.

TECHNICAL FIELD

The present disclosure generally relates to distributed computing and more specifically to a distributed multi-choice voting/ranking algorithm with an optimal number of states.

BACKGROUND

One of the key building blocks in distributed function computation is "Majority Voting". Majority voting can be employed as a subroutine in many network applications such as target detection in sensor networks, distributed hypothesis testing, quantized consensus, voting in distributed systems, and molecular nano-robots. In distributed majority voting, each node chooses a candidate from a set of choices, with the goal of determining the candidate with the majority vote by running a distributed algorithm.

A generalization of distributed voting is distributed ranking, where the goal is to rank the choices according to the number of votes, each taken from different network nodes. As an example of majority voting in target detection, wireless sensors combine their binary decisions about the presence of a target through majority voting, and send a report to the fusion center if a majority is in favor of presence.

However, distributed majority voting is also associated with drawbacks for the binary case. It has been shown that there is no synchronous deterministic algorithm that can solve binary voting in a connected network. Several two-state algorithms have been proposed for the ring topology, the most successful of which can receive the correct result in nearly 83% of initial configurations of selected votes. In order to circumvent the impossibility result, asynchronous and probabilistic algorithms have also been presented. However, none of these algorithms can guarantee convergence to the correct result.

Applying a different approach, the distributed binary voting problem described above may be solved by randomized gossip algorithms that compute the average of initial node values. However, a drawback of this approach is that the number of required states in its quantized version grows linearly with respect to the network size. Recently, a randomized solution has been proposed for binary voting with four states. The extended version of this solution works only for ternary and quaternary voting cases with 15 and 100 states, respectively.

Thus, there is a need for a simplified method of distributed voting/ranking that is effective for any number of choices. There is further a need for a distributed voting/ranking algorithm with a minimum number of states per node. There is also a need for a distributed voting/ranking algorithm that is independent from the network size and is easily scalable in terms of the number of choices.

SUMMARY

This summary is intended to provide an overview of the subject matter of this patent, and is not intended to identify essential elements or key elements of the subject matter, nor is it intended to be used to determine the scope of the claimed implementations. The proper scope of this patent may be ascertained from the claims set forth below in view of the detailed description below and the drawings.

In one general aspect, the present disclosure describes methods for distributed multi-choice voting/ranking (DMVR) in a network with a plurality of nodes associated to a set of choices C $\{c_1, \ldots, c_k, \ldots, c_n\}$. The method can include setting a plurality of value sets for the plurality of nodes at a moment t, including a first value set $v_i(t)$ for a first node i having a first size $|v_i(t)|$ and a second value set $v_j(t)$ for a second node j having a second size $|v_j(t)|$, as well as setting a plurality of collections of memory sets for the plurality of nodes at the moment t, including a first collection of memory sets $m_{i,k}(t)$ for the first node i and a second collection of memory sets $m_{j,k}(t)$ for the second node j. The method further includes generating a first time $t^i$ for the first node i and a second time $t^j$ for the second node j, updating the first value set $v_i(t)$ at the first time $t^i$ to obtain an updated first value set $v_i(t^i)$ with an updated first size $|v_i(t^i)|$, and updating the second value set $v_j(t)$ at the second time $t^j$ to obtain an updated second value set $v_j(t^j)$ with an updated second size $|v_j(t^j)|$. In addition, the method includes updating the first collection of memory sets $m_{i,k}(t)$ at the time $t^i$ to obtain an updated first memory set $m_{i,|Vi(t^i)|}(t^i)$, and updating the second collection of memory sets $m_{j,k}(t)$ at the time $t^j$ to obtain an updated second memory set $m_{j,|Vj(t^j)|}(t^j)$, calculating a majority vote $\pi_1$ for the set of choices C, and calculating a rank set $\{\pi_k\}$ for the set of choices C.

The above general aspect may include one or more of the following features. In an example implementation of DMVR, the steps of updating the first value set, updating the second value set, updating the first collection of memory sets, updating the second collection of memory sets, calculating the majority vote, and calculating the rank set may be iterated until a convergence is achieved. In some implementations, the steps of updating the first value set, updating the second value set, updating the first collection of memory sets, and updating the second collection of memory sets may include calculating a union set and an intersection set. The union set may include the union of the first value set and the second value set, and the intersection set may include the intersection of the first value set and the second value set. In some other implementations, the majority vote may include the updated first memory set when the updated first size equals one. In addition, the step of calculating the rank set may include the set-theoretic difference of two different members of the updated first collection of memory sets. Furthermore, the second node may be a random neighbor of the first node. In some implementations, the step of setting the plurality of value sets may include initializing the first value set with a first initial vote of the first node, and initializing the second value set with a second initial vote of the second node. In some cases, the step of setting the plurality of collections of memory sets may include initializing the first collection of memory sets with empty sets, and initializing the second collection of memory sets with empty sets. In some implementations, the intersection set may be replaced with the set of choices if the intersection set is an empty set. In another example, the updated first memory set may be replaced with a set having one random element from the updated first value set, if the updated first memory set is not a subset of the updated first value set. In addition, the steps of updating the first collection of memory sets and updating the second collection of memory sets may further include generating a random variable from Bernoulli distribution with success probability 0.5. The first collection of memory sets may be updated if the random variable equals 1, and the second collection of memory sets may be updated if the random variable does not equal 1. In addition, in some cases, the moment t includes an initial moment $t_0$ or a moment after the initial moment $t_0$, and the first time $t^i$ and the second time $t^j$ are generated after the moment t. In another implementation, the step of setting the plurality of value sets includes initializing the first value set $v_i(t)$ at the initial moment $t_0$ with a first initial vote of the first node i, and initializing the second value set $v_j(t)$ at the initial moment $t_0$ with a second initial vote of the second node j. The step of setting the plurality of collections of memory sets can also include initializing the first collection of memory sets $m_{i,k}(t)$ at the initial moment $t_0$ with empty sets, and initializing the second collection of memory sets $m_{j,k}(t)$ at the initial moment $t_0$ with empty sets. In addition, the second node j may include a random neighbor of the first node i. In some cases, the steps of generating the first time $t^i$ and the second time $t^j$, updating the first value set $v_i(t)$ and the second value set $v_j(t)$, updating the first collection of memory sets $m_{i,k}(t)$ and the second collection of memory sets $m_{j,k}(t)$, calculating the majority vote $\pi_1$, and calculating the rank set $\{\pi_k\}$ are iterated until a convergence is achieved. The majority vote $\pi_1$ can include the updated first memory set $m_{i,|vi(t^i)|}(t^i)$ when the updated first size $|v_i(t^i)|$ equals one. In another example, calculating the rank set $\{\pi_k\}$ includes operations can be defined by the following:

$$\pi_k = \begin{cases} m_{i,k}(t^i) \setminus m_{i,k-1}(t^i), & \text{if } k > 1 \\ m_{i,k}(t^i), & \text{if } k = 1 \end{cases}$$

wherein k is an integer number that is associated to a choice $c_k$ from the set of choices C, $m_{i,k}(t^i)$ is an updated first collection of memory sets, \ is the set-theoretic difference operator, and $\pi_k$ is a member of the rank set $\{\pi_k\}$ that shows the rank of the choice $c_k$. In another example, the intersection set $v_i(t) \cap v_j(t)$ is replaced with the set of choices C if the intersection set $v_i(t) \cap v_j(t)$ is an empty set. Furthermore, the updated first memory set $m_{i,|vi(t^i)|}(t^i)$ can be replaced with a set having one random element from the updated first value set $v_i(t^i)$ if the updated first memory set $m_{i,|vi(t^i)|}(t^i)$ is not a subset of the updated first value set $v_i(t^i)$.

In another general aspect, the present disclosure describes a method for state-optimal ranking in a network with a plurality of nodes associated to a set of choices C $\{c_1, \ldots, c_k, \ldots, c_n\}$, where the method includes setting a plurality of ordered sets for the plurality of nodes at a moment t, including a first ordered set $a_i(t)$ for a first node i and a second ordered set $a_j(t)$ for a second node j, and generating a first time $t^i$ for the first node i and a second time $t^j$ for the second node j. Furthermore the method includes updating the first ordered set $a_i(t)$ at the first time $t^i$ and updating the second ordered set $a_j(t)$ at the second time $t^j$ according to a plurality of permutation sets, to obtain an updated first ordered set $a_i(t^i)$ and an updated second ordered set $a_j(t^j)$, and calculating a rank set $\{\pi_k\}$ for the set of choices C according to the updated first ordered set $a_i(t^i)$ and the updated second ordered set $a_j(t^j)$.

The above general aspect may include one or more of the following features. In some cases, the updated first ordered set may include a first permutation set, a second permutation set, and a third permutation set. In addition, the updated second ordered set may include a fourth permutation set, a fifth permutation set, and a sixth permutation set. In some implementations, the first permutation set may include a permutation of an intersection set that preserves the order of entries in accordance with the first ordered set. Furthermore, the second permutation set may include a permutation of the set-theoretic difference of a union set and the intersection set that preserves the order of entries in accordance with the first ordered set. The third permutation set may include a permutation of the set-theoretic difference of the set of choices and the union set that preserves the order of entries in accordance with the first ordered set. Similarly, in some cases, the fourth permutation set may include a permutation of the intersection set that preserves the order of entries in accordance with the second ordered set. The fifth permutation set may include a permutation of the set-theoretic difference of the union set and the intersection set that preserves the order of entries in accordance with the second ordered set. The sixth permutation set may include a permutation of the set-theoretic difference of the set of choices and the union set that preserves the order of entries in accordance with the second ordered set. In some implementations, the steps of updating the first ordered set, updating the second ordered set, and calculating the rank set may be iterated until a convergence is achieved. In some cases, the rank set may include the updated first ordered set, or the updated second ordered set. In some implementations, the step of setting the plurality of ordered sets may include initializing the first ordered set's first entry with the first node's preferred element from the set of choices, initializing the first ordered set's other entries with an arbitrary permutation of other elements that excludes the first node's preferred element from the set of choices, initializing the second ordered set's first entry with the second node's preferred element from the set of choices, initializing the second ordered set's other entries with an arbitrary permutation of other elements that excludes the second node's preferred element from the set of choices, initializing a first pointer to 1, and initializing a second pointer to 1. The first pointer may include an integer number, and the second pointer may include an integer number that is equal or larger than the first pointer. In another example, the intersection set may include the intersection of a permutation of the first ordered set and a permutation of the second ordered set, and the union set may include the union of the permutation of the first ordered set and the permutation of the second ordered set. The permutation of the first ordered set may include a number of first entries of the first ordered set. The number may be determined by the first pointer. The permutation of the second ordered set may include a number of first entries of the second ordered set. The number may be determined by the second pointer. In some implementations, the first pointer and the second pointer may be updated according to the intersection set's size and the union set's size. In another implementation, the second node may be a random neighbor of the first node. Furthermore, the second node j can include a random neighbor of the first node i. In some cases, the moment t includes an initial moment $t_0$ or a moment after the initial moment $t_0$, and the first time $t^i$ and the second time $t^j$ are generated after the moment t. In another example, generating the first time $t^i$ and the second time $t^j$, updating the first ordered set $a_i(t)$, updating the second ordered set $a_j(t)$ and calculating the rank set $\{\pi_k\}$ are iterated until a convergence is achieved. In some cases, the rank set $\{\pi_k\}$ includes the updated first ordered set $a_i(t^i)$, or the updated second ordered set $a_j(t^j)$. In one implementation, the step of setting the plurality of ordered sets further includes initializing the first ordered set $a_i(t)$'s first entry at the initial moment $t_0$ with the first node i's preferred element from the set of choices C, and initializing the first ordered set $a_i(t)$'s other entries at the initial moment $t_0$ with an arbitrary permutation of other elements that excludes the first node i's preferred element from the set of choices C, initializing the second ordered set $a_j(t)$'s first entry with the second node j's preferred element from the set of choices C, and initializing the second ordered set $a_j(t)$'s other entries at the initial moment $t_0$ with an arbitrary permutation of other elements that excludes the second node j's preferred element from the set of choices C, initializing a first pointer $p_i(t)$ at the initial moment $t_0$ to one, wherein the first pointer $p_i(t)$ includes an integer number, and initializing a second pointer $p_j(t)$ at the initial moment $t_0$ to one, wherein the second pointer $p_j(t)$ includes an integer number that is equal or larger than the first pointer $p_i(t)$. As another example, updating the first ordered set $a_i(t)$ and updating the second ordered set $a_j(t)$ can include operations defined by the following: $a_i(t'):=\{\Pi_1(t), \Pi_2(t), \Pi_3(t)\}$, $a_j(t'):=\{\Pi_4(t), \Pi_5(t), \Pi_6(t)\}$, wherein $\Pi_1(t)$ is a first permutation set that includes a permutation of an intersection set $A_1$ that preserves the order of entries in accordance with the first ordered set $a_i(t)$, $\Pi_2(t)$ is a second permutation set that includes a permutation of the set-theoretic difference of a union set $A_2$ and the intersection set $A_1$ that preserves the order of entries in accordance with the first ordered set $a_i(t)$, $\Pi_3(t)$ is a third permutation set that includes a permutation of the set-theoretic difference of the set of choices C and the union set $A_2$ that preserves the order of entries in accordance with the first ordered set $a_i(t)$, $\Pi_4(t)$ is a fourth permutation set that includes a permutation of the intersection set $A_1$ that preserves the order of entries in accordance with the second ordered set $a_j(t)$, $\Pi_5(t)$ is a fifth permutation set that includes a permutation of the set-theoretic difference of the union set $A_2$ and the intersection set $A_1$ that preserves the order of entries in accordance with the second ordered set $a_j(t)$, and $\Pi_6(t)$ is a sixth permutation set that includes a permutation of the set-theoretic difference of the set of choices C and the union set $A_2$ that preserves the order of entries in accordance with the second ordered set $a_j(t)$. In some cases, calculating the intersection set $A_1$ and the union set $A_2$ includes operations defined by the following: $A_1 = a_i^{1:p_i(t)} \cap a_j^{1:p_j(t)}$, $A_2 = a_i^{1:p_i(t)} \cup a_j^{1:p_j(t)}$ wherein $a_i^{1:p_i(t)}$ includes a permutation of the first ordered set $a_i(t)$ that comprises the first $p_i(t)$ entries of the first ordered set $a_i(t)$, and $a_j^{1:p_j(t)}$ includes a permutation of the second ordered set $a_j(t)$ that comprises the first $p_j(t)$ entries of the second ordered set $a_j(t)$. Furthermore, updating the first ordered set $a_i(t)$ and updating the second ordered set $a_j(t)$ can further include updating the first pointer $p_i(t)$ and the second pointer $p_j(t)$ according to operations defined by the following: $p_i(t')=|A_2|$, $p_j(t')=|A_1|$ wherein $|A_1|$ is the intersection set $A_1$'s size, $|A_2|$ is the union set $A_2$'s size, $p_i(t')$ is an updated first pointer and $p_j(t')$ is an updated second pointer.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

A method for distributed multi-choice voting/ranking is disclosed. The disclosed distributed multi-choice voting/ranking method, also referred to herein as the DMVR method, calculates a majority vote and a rank set for a set of choices associated to a network with a plurality of nodes. The present disclosure further includes a design and simulation of iterative procedures for distributed multi-choice voting/ranking, which may include initializing and updating a plurality of value sets, collections of memory sets, and/or ordered sets. In some implementations, the majority vote and the rank set may be obtained after the iterative procedures reach a convergence.

Figure 1:
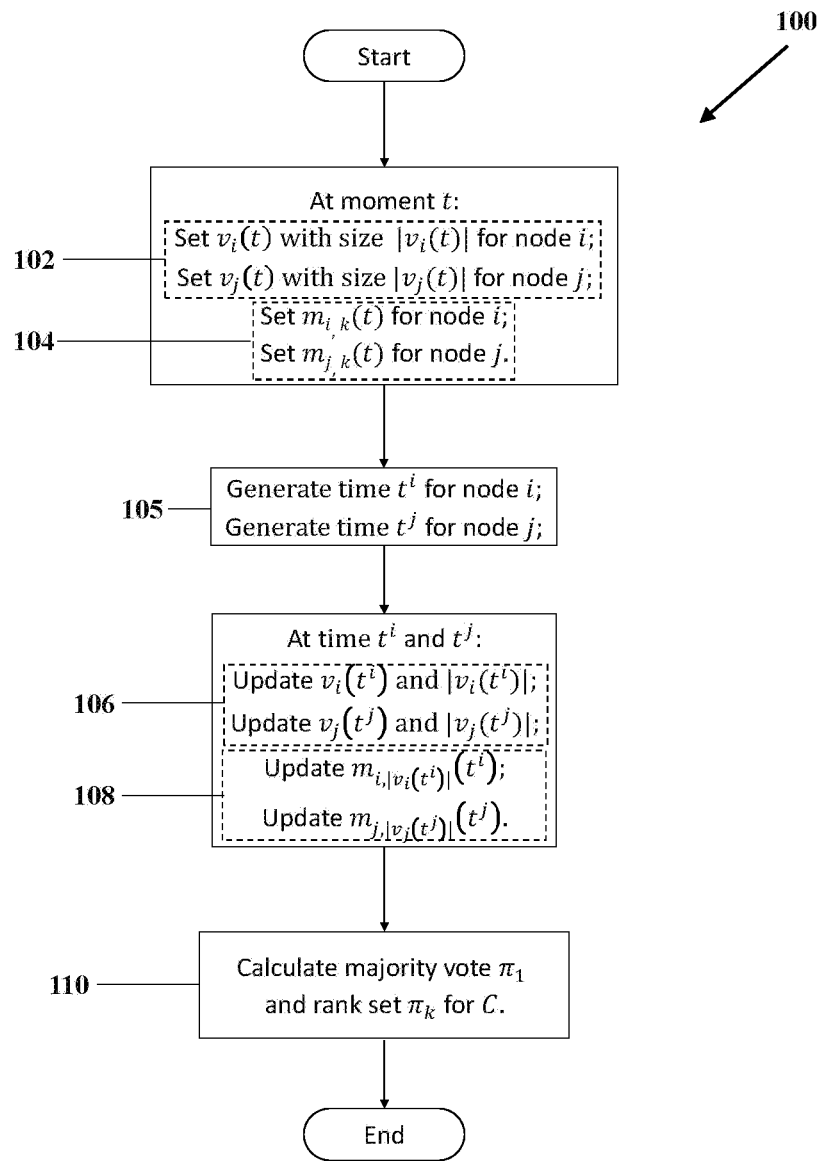
FIG. 1 is a flowchart illustrating an implementation of a method for distributed multi-choice voting/ranking in a network with a plurality of nodes.

For purposes of clarity, FIG. 1 provides a flowchart of an implementation of a method 100 for distributed multi-choice voting/ranking (DMVR) in a network with n nodes. In FIG. 1, the topology of the network is represented by a connected undirected graph where any two nodes of the network, for example, node i and node j, can communicate directly if there is an edge between them. In this example, the nodes are associated to a set of choices C with K elements (choices) that can be identified by values $c_1, \ldots, c_k, \ldots, c_K$.

For purposes of this description, $\#c_k$ can be understood to refer to the number of nodes that select the choice $c_k$. The goal of the voting problem can include finding a choice $c_m$, $1 \leq m \leq K$, that is in majority. In other words, ascertaining the choice $c_m$ satisfying $\#c_m \geq \#c_n$, $n \in \{1, \ldots, K\}$. In a ranking problem, the desired output may include a permutation $\{\pi_k\}$ of C such that $\#\pi_k \geq \#\pi_{k+1}$, $\forall k \in \{1, \ldots, K\}$.

Referring to the implementation shown in FIG. 1, the method 100 may include setting or establishing a plurality of value sets for the plurality of nodes at a moment t (a first step 102) such as for example, a first value set $v_i(t)$ for a first node i having a first size $|v_i(t)|$ and a second value set $v_j(t)$ for a second node j having a second size $|v_j(t)|$. A second step 104 includes setting or establishing a plurality of collections of memory sets for the plurality of nodes at the moment t, such as for example, a first collection of memory sets $m_{i,k}(t)$ for the first node i and a second collection of memory sets $m_{j,k}(t)$ for the second node j. The method 100 also includes generating updated time instants for at least two of the plurality of nodes, such as for example, a time $t^i$ for node i and a time $t^j$ for node j (a third step 105). A fourth step 106 comprises updating at least two of the plurality of value sets at respective updated time instants, such as for example, updating the first value set $v_i(t)$ at time $t^i$ to obtain an updated first value set $v_i(t^i)$ with an updated first size $|v_i(t^i)|$, and updating the second value set $v_j(t)$ at time $t^j$ to obtain an updated second value set $v_j(t^j)$ with an updated second size $|v_j(t^j)|$. The method further includes updating at least two of the plurality of collections of memory sets at respective updated time instants, such as for example, updating the first collection of memory sets $m_{i,k}(t)$ at time $t^i$ to obtain an updated first memory set $m_{i,|Vi(t^i)|}(t^i)$, and updating the second collection of memory sets $m_{j,k}(t)$ at time $t^j$ to obtain an updated second memory set $m_{j,|Vj(t^j)|}(t^j)$ (a fifth step 108). In addition, a sixth step 110 involves calculating a majority vote $\pi_1$ for the set of choices C, and calculating a rank set $\{\pi_k\}$ for the set of choices C.

In some implementations of first step 102, n value sets $v_1(t), \ldots, v_n(t)$ for the n nodes may be set at a moment t. For example, value set $v_i(t)$ for node i, and value set $v_j(t)$ for node j, may be set. Corresponding sizes for the n value sets, for example size $|v_i(t)|$ for node i and size $|v_j(t)|$ for node j may also be calculated. In different implementations of second step 104, n collections of memory sets, $m_{1,k}(t), \ldots, m_{n,k}(t)$, each associated to a choice k from the set of choices C, where $1 \leq k \leq K$, may be set for the n nodes at the moment t. For example, collection $m_{i,k}(t)$ may be set for node i, and collection $m_{j,k}(t)$ may be set for node j. Each memory set may be a subset of the set of choices C.

Furthermore, in some implementations, in third step 105 updated time instants may be generated after the moment t, and each value set may be updated at the respective updated time instant at fourth step 106, to obtain updated value sets. For example, value set $v_i(t)$ may be updated at time $t^i$ to obtain the updated value set $v_i(t^i)$ with the updated size $|v_i(t^i)|$, and value set $v_j(t)$ may be updated at time $t^j$ to obtain the updated value set $v_j(t^j)$.

In some implementations, during fifth step 108 each memory set from the collections of memory sets that is associated to a choice k equal to size of a corresponding value set may be updated. For example, at time $t^i$, memory set $m_{i,|vi(t^i)|}(t)$ from the collection $m_{i,k}(t)$, which is associated to the updated size $|v_i(t^i)|$, may be updated to obtain the updated memory set $m_{i,|vi(t^i)|}(t^i)$. Similarly, memory set $m_{j,|vj(t^j)|}(t^j)$ from collection $m_{j,k}(t)$, which is associated to the updated size $|v_j(t^j)|$, may be updated to obtain the updated memory set $m_{j,|vj(t^j)|}(t^j)$.

In sixth step 110, the method 100 may calculate a majority vote $\pi_1$ and a rank set $\{\pi_K\}$ for the set of choices C. The members of the set of choices C may be sorted in the rank set $\{\pi_k\}$ according to their votes in a descending order. In one implementation, the majority vote $\pi_1$ may be the first member of the rank set $\{\pi_k\}$.

In different implementations, the procedure of updating the value sets and the collections of memory sets may be expressed as follows:

---

If $|v_i(t)| \leq |v_j(t)|$ then
$\quad v_i(t^i) := v_i(t) \cup v_j(t), v_j(t^j) := v_i(t) \cap v_j(t)$
Else
$\quad v_i(t^i) := v_i(t) \cap v_j(t), v_j(t^j) := v_i(t) \cup v_j(t)$
End if
If $v_i(t^i) \neq \emptyset$ Then
$\quad m_{i,|vi(t^i)|}(t^i) := v_i(t^i), m_{j,|vj(t^j)|}(t^j) := v_j(t^j)$
End if

--- where (1) the moment t may be an initial moment, for example $t_0 = 0$, or a moment after the initial moment $t_0$; (2) the time $t^i$ and the time $t^j$ are generated after the moment t; (3) the node j may be a random neighbor of the node i, that is nodes i and j may communicate directly; (4) $v_i(t) \cup v_j(t)$ is a union set, that is, the union of the value set $v_i(t)$ and the value set $v_j(t)$; (5) $v_i(t) \cap v_j(t)$ is an intersection set, that is, the intersection of the value set $v_i(t)$ and the value set $v_j(t)$; (6) the updated memory set $m_{i,|vi(t^i)|}(t^i)$ is associated to the updated size $|v_i(t^i)|$; and (7) the updated memory set $m_{j,|vj(t^j)|}(t^j)$ is associated to the updated size $|v_j(t^j)|$. It should be understood that updating the memory sets may be ignored if the value set $v_i(t)$ is an empty set. The union and the intersection operations may be considered as a consolidating function that consolidates node choices across the network. Updating the memory sets may be understood to provide a disseminating function that disseminates the consolidated results throughout the network. The consolidating and disseminating functions may be executed in parallel.

In some implementations, at each iteration of the distributed multi-choice voting/ranking, the updated time instants such as time $t^i$ and time $t^j$ may be generated according to a random process, such as a Poisson process. In an example implementation, local clocks may be assigned to each of the plurality of nodes, and each clock may tick according to a random process at a respective updated time instant of the respective node.

In different implementations, generating time $t^i$ and the time $t^j$ (third step 105), updating the first value set $v_i(t)$ and the second value set $v_j(t)$ (fourth step 106), updating the first collection of memory sets $m_{i,k}(t)$ and the second collection of memory sets $m_{j,k}(t)$ (fifth step 108), and calculating the majority vote $\pi_1$ and the rank set $\{\pi_k\}$ (sixth step 110) may be iterated until a convergence is achieved. Accordingly, the updated value sets and updated memory sets of the previous iteration replace the value sets and memory sets at the moment t for the current iteration to obtain new updated value sets and updated memory sets. This process may be iterated until the convergence is achieved.

In some implementations, the majority vote $\pi_1$ and the rank set $\{\pi_k\}$ may be calculated by the following equation:

$$\pi_k = \begin{cases} m_{i,k}(t^i) \setminus m_{i,k-1}(t^i), & \text{if } k > 1 \\ m_{i,k}(t^i), & \text{if } k = 1 \end{cases} \quad \text{Equation (1)}$$

where (1) k is an integer number that is associated to an element $c_k$ from the set of choices C, (2) $m_{i,k}(t^i)$ is an updated collection at the time $t^i$ from the collection $m_{i,k}(t)$ at the moment t, (3) \ is the set-theoretic difference operator, and (4) $a_k$ is a member of the rank set $\{\pi_k\}$ that shows the rank of the choice $c_k$. The majority vote $\pi_1$ may be the first member of the rank $\{\pi_k\}$, that is $m_{i,1}(t^i)$, which may have the highest number of votes among the choices from the set of choices C. In some cases, updating memory sets in the distributed multi-choice voting/ranking may be limited to memory sets that are associated to value set sizes, for example the memory set $m_{i,|vi(t^i)|}(t^i)$ that is associated to the updated size $|v_i(t)|$. In these types of cases, any updated memory set that is associated to a value set size equal to one, that is the corresponding value set having only one element, may be selected as the majority vote $\pi_1$. In other words, the operations of Equation (1) may be performed on any node in the network.

In some implementations, prior to the first step 102 of the distributed multi-choice voting/ranking, the value sets and memory sets may be initialized at the initial moment $t_0$. Each value set may be initialized with an initial vote, that is, a preferred choice from the set of choices C that is associated to the corresponding node of each value set. For example, the set $v_i(t)$ may be initialized with a first initial vote of node i at the moment $t=t_0$, and the set $v_j(t)$ may be initialized with a second initial vote of the node j at the moment $t=t_0$. Following initialization in the distributed multi-choice voting/ranking, the value sets may remain subsets of the set of choices C.

In one implementation, for initialization of the memory sets, each collection of memory sets may be initialized with empty sets at the initial moment. For example, the collection $m_{i,k}(t)$ and collection $m_{j,k}(t)$ may be initialized with empty sets at the moment $t=t_0$.

For each node of the network in the distributed multi-choice voting/ranking, a state can be defined as consisting of a pair of a collection of memory sets and a value set. For example, for the case of the majority vote in, the pair of the collection $m_{i,1}(t)$ and the value set $v_i(t)$, that is $(m_{i,1}(t), v_i(t))$ may be the state of the node i, leading to the total number of $K \times 2^K$ sates.

Furthermore, the number of states may be reduced by adding the following rules to the distributed multi-choice voting/ranking at each iteration:

If the intersection set $v_i(t) \cap v_j(t)$ is an empty set, it can be replaced with the set of choices C; and If the updated memory set $m_{i,|vi(t^i)|}(t^i)$ is not a subset of the updated value set $v_i(t^i)$, the updated memory set $m_{i,|vi(t^i)|}(t^i)$ can be replaced with a set having one random element from the updated first value set $v_i(t^i)$.

Updating the collections of memory sets may be further modified to increase the execution speed of the distributed multi-choice voting/ranking. For example, the following procedure may be used:

---

If $|v_i(t^i)| > 1$ and $|v_j(t^j)| > 1$ then
    Generate a random variable u from Bernoulli distribution with success probability 0.5;
    If u = 1 then
        $m_{i,k(t^i)} := m_{j,k}(t)$;
    Else
        $m_{j,k}(t^j) := m_{i,k}(t)$;
    End if;
End if

--- where $m_{i,k}(t^i)$ is an update for the collection $m_{i,k}(t)$ at the time $t^i$, and $m_{j,k}(t^j)$ is an update for the collection $m_{j,k}(t)$ at the time $t^j$.

In some implementations, the disclosed methods can include provisions for obtaining an optimal number of states. For example, the distributed multi-choice voting/ranking can be modified to obtain a state-optimal ranking, which also may be referred to as enhanced DMVR, in a network with n nodes $\{1, \ldots, i, \ldots, j, \ldots, n\}$ associated to a set of choices C $\{c_1, \ldots, c_k, \ldots, c_K\}$. In the state-optimal ranking, the value sets and the collections of memory sets may be replaced with ordered sets. For example, an ordered set $a_i(t)=\{a_i^1(t), \ldots, a_i^K(t)\}$ may be set at a moment t for a node i, and an ordered set $a_j(t)=\{a_j^1(t), \ldots, a_j^K(t)\}$ may be set at the moment t for a node j of the network. Similar to the distributed multi-choice voting/ranking, updated time instants may be generated for respective nodes. For example, a time $t^i$ may be generated for node i and a time $t^j$ may be generated for node j after the moment t in the state-optimal ranking. The ordered sets may be updated at the updated time instants to obtain updated ordered sets. For example, the ordered set $a_i(t)$ may be updated at time $t^i$ to obtain an updated ordered set $a_i(t^i)$ for the node i, and the ordered set $a_j(t)$ may be updated at time $t^j$ to obtain an updated ordered set $a_j(t^j)$ for the node j. Next, the method may calculate a majority vote $\pi_1$ and a rank set $\{\pi_\kappa\}$ for the set of choices C. The members of the set of choices C may be sorted in the rank set $\{\pi_k\}$ according to their votes, in a descending order. The majority vote in may be the first member of the rank set $\{\pi_k\}$.

Figure 2:
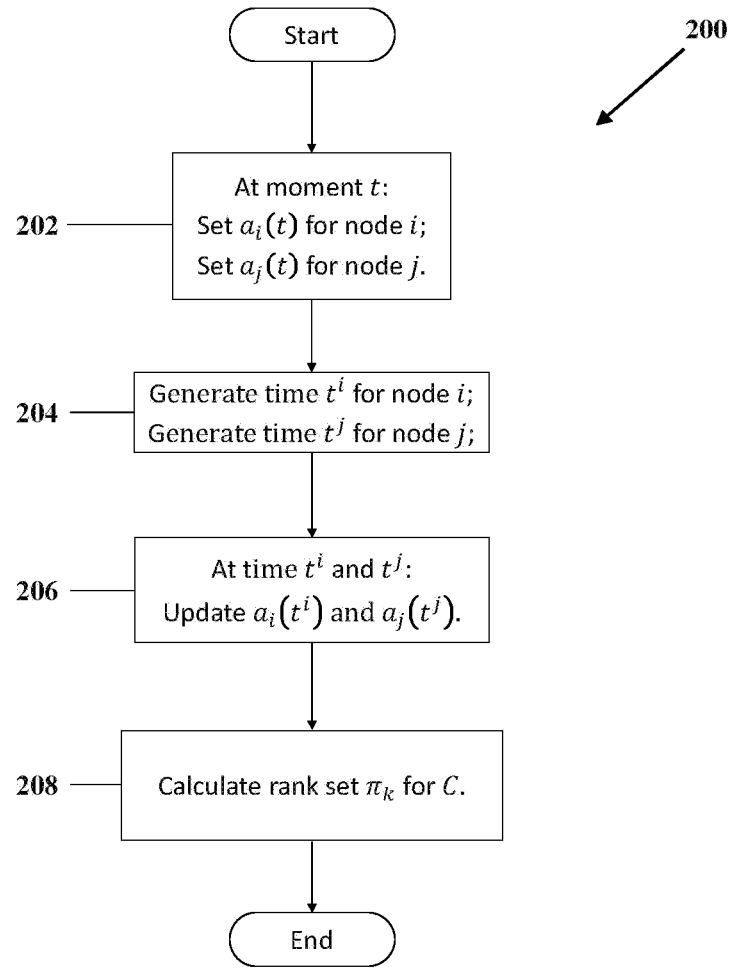
FIG. 2 is a flowchart illustrating an implementation of a method for state-optimal ranking in a network with a plurality of nodes.

In order to better illustrate this process, FIG. 2 presents a schematic of an enhanced method 200 for state-optimal ranking (enhanced DMVR) in a network with a plurality of nodes $\{1, \ldots, i, \ldots, j, \ldots, n\}$ associated to a set of choices C $\{c_1, \ldots, c_k, \ldots, c_K\}$. In contrast to the method 100 described above, in the enhanced method 200 the value sets and memory sets are replaced with a plurality of ordered sets to minimize the number of states, that is, possible values of the pair of memory set and value set for each node.

The enhanced method 200 may include setting or establishing a plurality of ordered sets for the plurality of nodes at a moment t (a first step 202), for example, a first ordered set $a_i(t)=\{a_i^1(t), \ldots, a_i^K(t)\}$ for a first node i and a second ordered set $a_j(t)=\{a_j^1(t), \ldots, a_j^K(t)\}$ for a second node j. In addition, the enhanced method 200 includes generating updated time instants for at least two of the plurality of nodes, such as for example, a time $t^i$ for node i and a time $t^j$ for node j (a second step 204), and updating at least two of the plurality of ordered sets at respective updated time instants according to a plurality of permutation sets (a third step 206), such as for example, updating the first ordered set $a_i(t)$ at time $t^i$ to obtain the updated ordered set $a_i(t^i)$ for node i, and updating the second ordered set $a_j(t)$ at time $t^j$ to obtain the updated second ordered set $a_j(t^j)$ for node j. A fourth step 208 involves calculating the rank set $\{\pi_k\}$ for the set of choices C according to the updated first ordered set $a_i(t^i)$ and the updated second ordered set $a_i(t)$.

In some implementations, updating the ordered sets may be performed through the following operations:

$$a_i(t^i) := \{\Pi_1(t), \Pi_2(t), \Pi_3(t)\}, a_j(t^j) := \{\Pi_4(t), \Pi_5(t), \Pi_6(t)\};$$

where (1) the moment t includes an initial moment $t_0$ or a moment after the initial moment $t_0$; (2) the time $t^i$ and the time $t^j$ are generated after the first moment t; (3) node j may be a random neighbor of node i, that is nodes i and j may communicate directly; (4) $\Pi_1(t)$ is a permutation of an intersection set $A_1$ that preserves the order of entries in accordance with the ordered set $a_i(t)$; (5) $\Pi_2(t)$ is a permutation of the set-theoretic difference of $A_2$ and $A_1$, that is, $A_2 \backslash A_1$, which preserves the order of entries in accordance with $a_i(t)$; (6) $\Pi_3(t)$ is a permutation of the set-theoretic difference of the set of choices C and $A_2$, that is, $C \backslash A_2$, which preserves the order of entries in accordance with $a_i(t)$; (7) $\Pi_4(t)$ is a permutation of $A_1$ that preserves the order of entries in accordance with the ordered set $a_j(t)$; (8) $\Pi_5(t)$ is a permutation of $A_2 \backslash A_1$ that preserves the order of entries in accordance with $a_j(t)$; and (9) $\Pi_6(t)$ is a permutation of $C \backslash A_2$ that preserves the order of entries in accordance with $a_j(t)$.

In addition, in one implementation, the intersection set $A_1$ and the union set $A_2$ may be expressed by the following Equation:

$$A_1 = a_i^{1:p_i(t)} \cap a_j^{1:p_j(t)}, A_2 = a_i^{1:p_i(t)} \cup a_j^{1:p_j(t)} \qquad \text{Equation (2)}$$

where (1) $p_i(t)$ is an integer number that can be perceived as a pointer to an entry of $a_i(t)$; (2) $p_j(t)$ is an integer number that can be perceived as a pointer to an entry of $a_j(t)$; (3) $a_i^{1:p_i(t)}$ is a permutation of $a_i(t)$ that may consist of the first $p_i(t)$ entries of $a_i(t)$, and (4) $a_j^{1:p_j(t)}$ is a permutation of $a_j(t)$ that may consist of the first $p_j(t)$ entries of $a_j(t)$. It may be assumed in equation (1) and equation (2), without a loss of generality, that $p_j(t) \geq p_i(t)$. Furthermore, in some implementations, the pointers may be updated as expressed below:

$$p_i(t^i) := |A_2|, p_j(t^j) := |A_1|$$

where (1) $|A_1|$ is the intersection set $A_1$'s size; (2) $|A_2|$ is the of the union set $A_2$'s size; (3) $p_i(t^i)$ is the updated pointer of node i at time $t^i$; and (4) $p_j(t^j)$ is the updated pointer of node j at $t^j$.

In some implementations, at each iteration of the state-optimal ranking, the updated time instants such as time $t^i$ and time $t^j$ may be generated according to a random process, such as a Poisson process. In an example implementation, local clocks may be assigned to each of the plurality of nodes, and each clock may tick according to a random process at a respective updated time instant of the respective node.

In some implementations, generating time $t^i$ and time $t^j$ (second step 204), updating the first ordered set $a_i(t)$ and updating the second ordered set $a_j(t)$ (third step 206), and calculating the rank set $\{\pi_k\}$ (fourth step 208) may be iterated or repeated until a convergence is achieved. Accordingly, the updated ordered sets of the previous iteration replace the ordered sets at the moment t for the current iteration to obtain new updated ordered sets. This process may be iterated until the convergence is achieved.

In some implementations, any ordered set that is associated with an arbitrary node in the network, for example the updated ordered set $a_i(t^i)$ associated to the node i, or the updated ordered set $a_j(t^j)$ associated to the node j, may be selected as the rank set $\{\pi_k\}$. In one implementation, the majority vote $\pi_1$ may be the first member of the rank $\{_k\}$, having the highest number of votes among the choices from the set of choices C.

In addition, in some cases prior to the first iteration of the state-optimal ranking, the ordered sets and the pointers may be initialized at the initial moment $t_0$. The first entry of each ordered set may be initialized with a preferred choice from the set of choices C that is associated to the corresponding node of each ordered set. For example, the first entry of $a_i(t)$ may be initialized with a preferred choice of the node i at the moment $t=t_0$, and the first entry of $a_j(t)$ may be initialized with a preferred choice of the node j at the moment $t=t_0$. Other entries of each ordered set may be initialized with an arbitrary permutation of other elements of C, excluding the preferred choice of the corresponding node of each ordered set. As one example, $a_i(t)$'s other entries may be initialized with an arbitrary permutation of other elements of C that excludes the node i's preferred element, and $a_j(t)$'s other entries may be initialized with an arbitrary permutation of other elements of C that excludes the node j's preferred element. Also, each pointer, for example $p_i(t)$ or $p_j(t)$, may be initialized to 1 at the moment $t=t_0$.

Example 1: Simulations of DMVR and Enhanced DMVR for Binary Voting/Ranking

In the following example, DMVR and enhanced DMVR are evaluated through simulations and compared with the Pairwise Asynchronous Graph Automata (PAGA) algorithm for binary voting/ranking in networks with n=100 nodes. Each point in simulations is averaged over 1000 runs.

Figure 3:
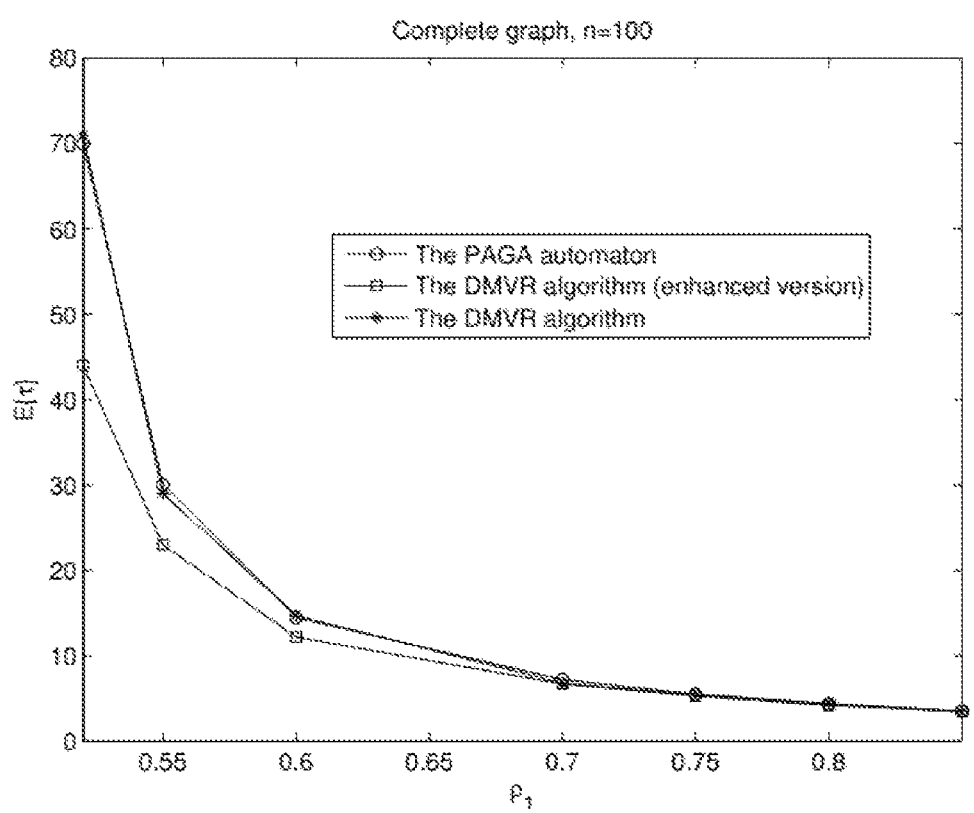
FIG. 3 is a graph illustrating average running times for implementations of three algorithms for binary voting in a complete graph with n=100 nodes.

Referring to FIG. 3, the average running time $E\{\tau\}$ of DMVR, enhanced DMVR, and PAGA versus the percentage $\rho_1$ of a vote $c_1$ in a complete graph with n nodes is shown, where $\rho_1 = \#c_1/n$. As seen in FIG. 3, the performance of DMVR and PAGA are very close to each other, in some cases overlapping. However, it is important to note that the enhanced version of DMVR algorithm clearly outperforms the two other algorithms as $\rho_1$ gets close to 0.5.

Figure 4A:
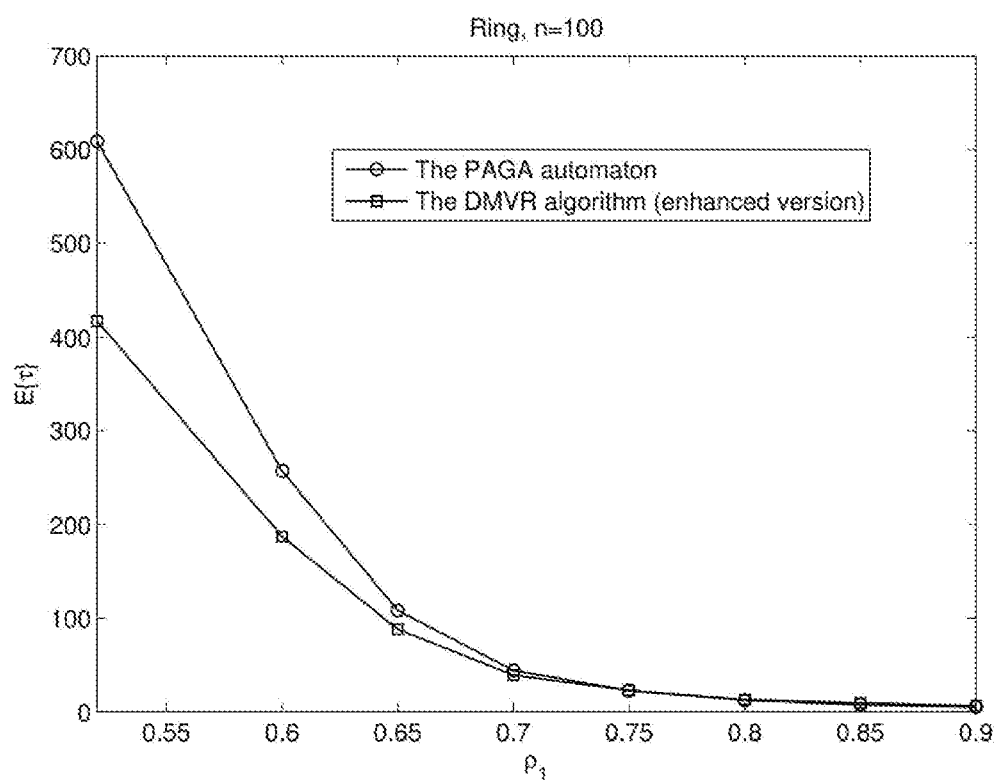
FIG. 4A is a graph illustrating average running times for implementations of two algorithms for binary voting in a ring network.
Figure 4B:
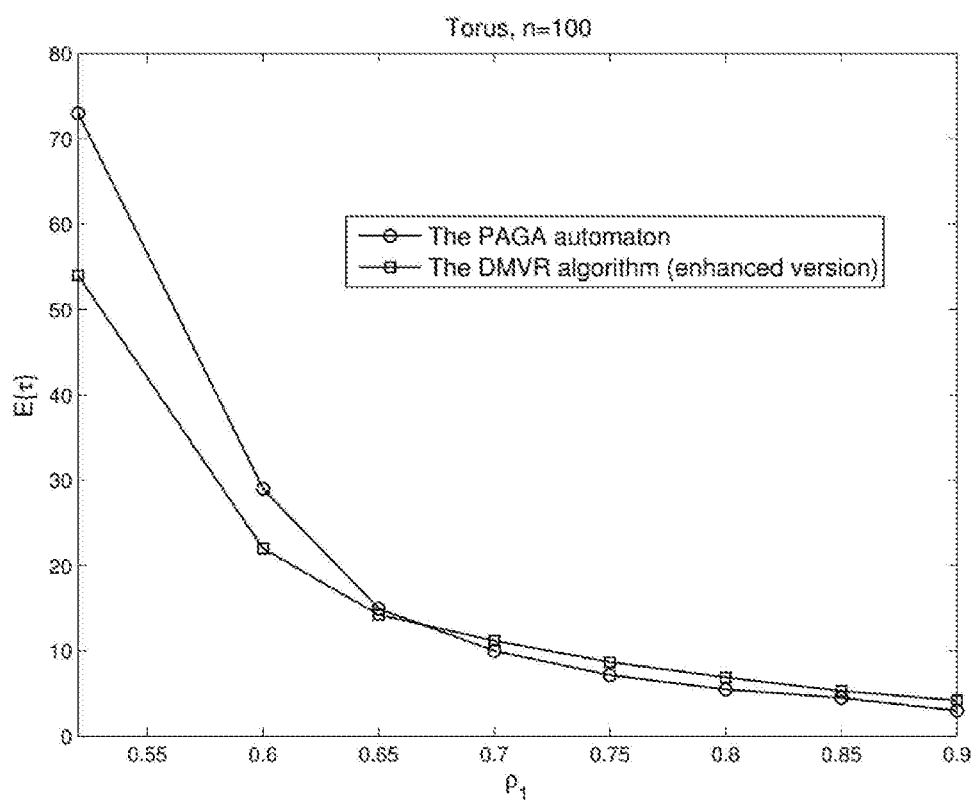
FIG. 4B is a graph illustrating average running time for implementations of two algorithms for binary voting in a torus network.

FIGS. 4A and 4B further illustrate results for this example. FIG. 4A presents the average running time $E\{\tau\}$ of enhanced DMVR and PAGA versus $\rho_1$ in a ring network, while FIG. 4B shows the average running time $E\{\tau\}$ of enhanced DMVR and PAGA versus $\rho_1$ in a torus network. As noted above with respect to FIG. 3, the enhanced DMVR algorithm provides a better or faster performance than the PAGA algorithm. In both the ring network and the torus network, it can be seen that as $\rho_1$ approaches 0.5, the $E\{\tau\}$ of enhanced DMVR is significantly less than the $E\{\tau\}$ of PAGA.

Example 2: Simulations of Enhanced DMVR for Ternary Voting/Ranking

In the following example, enhanced DMVR is evaluated through simulations and compared PAGA for ternary voting/ranking in a network with n=198 nodes. Each point in the simulations is averaged over 1000 runs. The percentage of initial votes is considered in the form of $[\rho_1, \rho_2, \rho_3] = [\frac{1}{3}+\delta, \frac{1}{3}, \frac{1}{3}-\delta]$ where $0 < \delta < \frac{1}{3}$.

Figure 5:
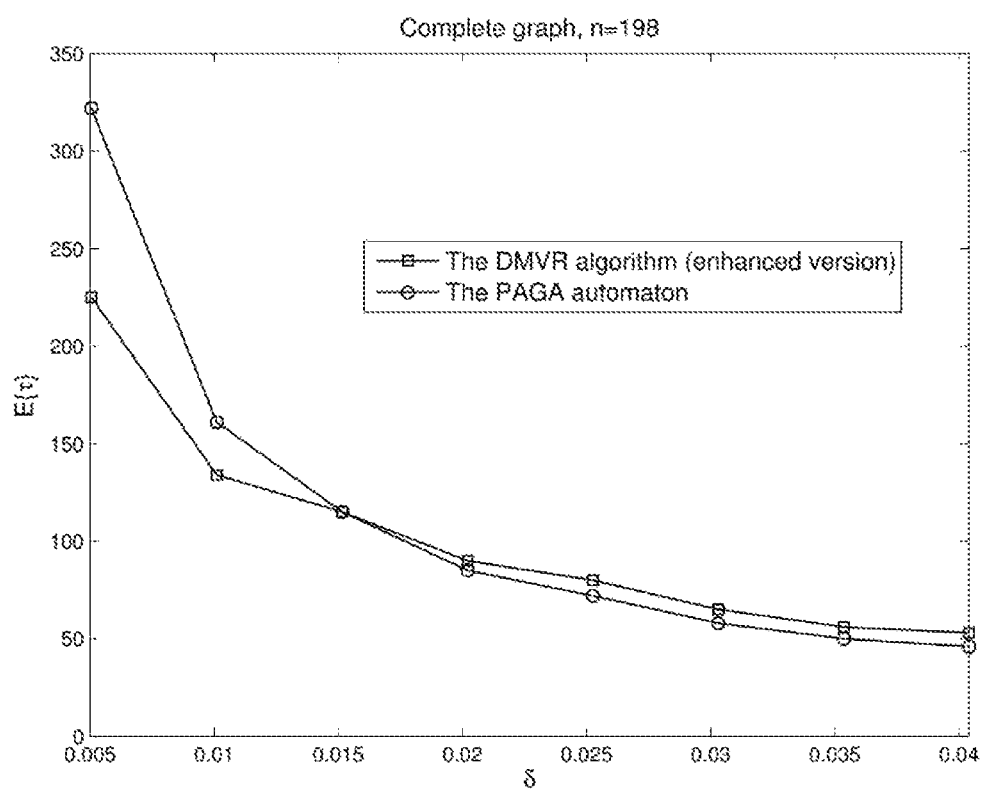
FIG. 5 is a graph illustrating variations of average running times of implementations of two algorithms for ternary voting in a network with n=198 nodes.

In the graph of FIG. 5, the average running time $E\{\tau\}$ of enhanced DMVR and PAGA for $\delta \in [0.005, 0.041]$ is presented. It can be seen that, once again, enhanced DMVR outperforms PAGA for small $\delta$, such that the $E\{\tau\}$ of enhanced DMVR is significantly less than the $E\{\tau\}$ of PAGA as $\delta$ approaches 0.005.

Figure 6:
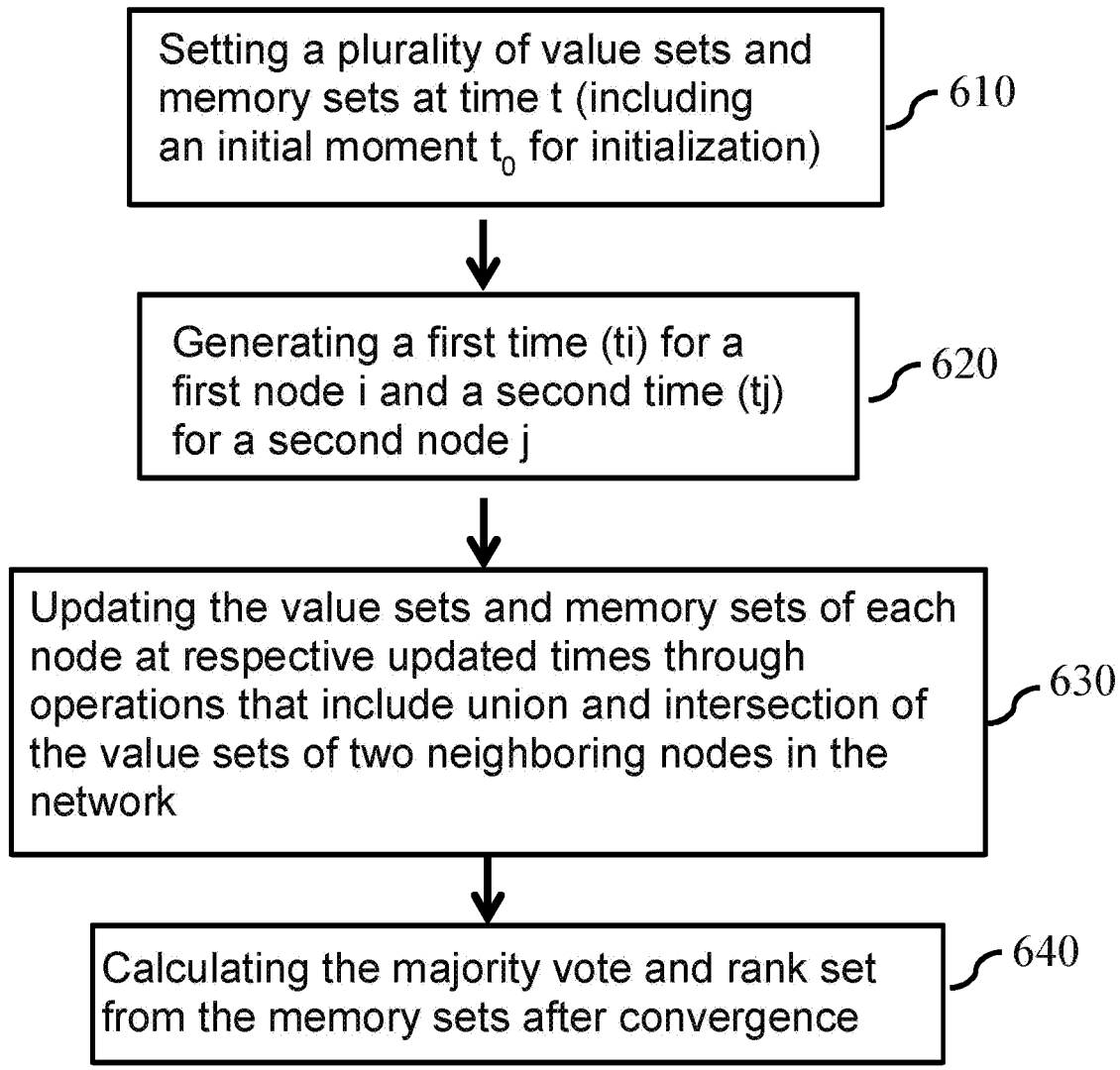
FIG. 6 is a flow chart depicting an implementation of the method for distributed multi-choice voting/ranking in a network with a plurality of nodes.

For purposes of clarity, FIG. 6 presents a flow chart illustrating an implementation of the methods described herein. In FIG. 6, a method for distributed multi-choice voting/ranking in a network with a plurality of nodes $\{1, \ldots, i, \ldots, j, \ldots, n\}$ associated to a set of choices C $\{c_1, \ldots, c_k, \ldots, c_K\}$ is provided. For example, a first step 610 can comprise setting or establishing a plurality of value sets and memory sets at time t (including an initial moment $t_0$ for initialization). In other words, first step 610 can involve setting or establishing a plurality of value sets for the plurality of nodes at a moment t, including a first value set $v_i(t)$ for a first node i having a first size $|v_i(t)|$ and a second value set $v_j(t)$ for a second node j having a second size $|v_j(t)|$, as well as setting or establishing a plurality of collections of memory sets for the plurality of nodes at the moment t, including a first collection of memory sets $m_{i,k}(t)$ for the first node i and a second collection of memory sets $m_{j,k}(t)$ for the second node j.

After generation of updated times for each node, for example time $t^i$ for node i and time $t^j$ for node j, in a second step 620, the value sets and memory sets are updated at the updated times through operations that include union and intersection of the value sets of two neighboring nodes in the network. For example, third step 630 can include updating the first value set $v_i(t)$ at the time $t^i$ to obtain an updated first value set $v_i(t^i)$ with an updated first size $|v_i(t^i)|$, updating the second value set $v_j(t)$ at the time t to obtain an updated second value set $v_j(t^j)$ with an updated second size $|v_j(t^j)|$, updating the first collection of memory sets $m_{i,k}(t)$ at the time $t^i$ to obtain an updated first memory set $m_{i,|vi(t^i)|}(t^i)$, and updating the second collection of memory sets $m_{j,k}(t)$ at the time $t^j$ to obtain an updated second memory set $m_{j,|vj(t^j)|}(t^j)$. Finally, fourth step 640 can comprise calculating the majority vote and rank set from the memory sets. Thus, a majority vote $\pi_1$ for the set of choices C can be calculated, and a rank set $\{\pi_k\}$ for the set of choices C can also be calculated.

The disclosed methods for distributed voting/ranking can provide a more effective approach in distributed function computation. The methods described herein provide for scalability of the voting/ranking method for any number of choices. In addition, the methods can be utilized to enhance the execution speed of distributed voting/ranking, as well as facilitate independence of the voting/ranking method from the network size, that is, the number of nodes in the network.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for distributed multi-choice voting or ranking in a network with a plurality of nodes associated to a set of choices C $\{c_1, \ldots, c_k, \ldots, c_n\}$, the method comprising:

setting a plurality of value sets for the plurality of nodes at a moment t, including a first value set $v_i(t)$ for a first node I having a first size $|v_i(t)|$ and a second value set $v_j(t)$ for a second node j having a second size $|v_j(t)|$;

setting a plurality of collections of memory sets for the plurality of nodes at the moment t, including a first collection of memory sets $m_{i,k}(t)$ for the first node I and a second collection of memory sets $m_{i,k}(t)$ for the second node j;

generating a first time $t^i$ for the first node I and a second time $t^j$ for the second node j;

updating the first value set $v_i(t)$ at the first time $t^i$ to obtain an updated first value set $v_i(t^i)$ with an updated first size $|v_i(t^i)|$, and updating the second value set $v_j(t)$ at the second time $t^j$ to obtain an updated second value set $v_j(t^j)$ with an updated second size $|v_j(t^j)|$;

updating the first collection of memory sets $m_{i,k}(t)$ at the time $t^i$ to obtain an updated first memory set $m_{i,|vi(t^i)|}(t^i)$, and updating the second collection of memory sets $m_{i,k}(t)$ at the time $t^j$ to obtain an updated second memory set $m_{j,|vj(t^j)|}(t^j)$;

calculating a majority vote $\pi_1$ for the set of choices C; and calculating a rank set $\{\pi_k\}$ for the set of choices C according to an operation defined by the following:

$$\pi_k = \begin{cases} m_{i,k}(t^i) \setminus m_{i,k-1}(t^i), & \text{if } k > 1 \\ m_{i,k}(t^i), & \text{if } k = 1 \end{cases}$$

wherein k is an integer number that is associated to a choice $c_k$ from the set of choices C, $m_{i,k}(t^i)$ is an updated first collection of memory sets, \ is the set-theoretic difference operator, and $\pi_k$ is a member of the rank set $\{\pi_k\}$ that shows the rank of the choice $c_k$.

2. The method of claim 1, wherein the moment t includes an initial moment $t_0$ or a moment after the initial moment $t_0$, and the first time $t^i$ and the second time $t^j$ are generated after the moment t.

3. The method of claim 2, wherein setting the plurality of value sets includes initializing the first value set $v_i(t)$ at the initial moment $t_0$ with a first initial vote of the first node i, and initializing the second value set $v_j(t)$ at the initial moment $t_0$ with a second initial vote of the second node j.

4. The method of claim 2, wherein setting the plurality of collections of memory sets includes initializing the first collection of memory sets $m_{i,k}(t)$ at the initial moment $t_0$ with empty sets, and initializing the second collection of memory sets $m_{j,k}(t)$ at the initial moment $t_0$ with empty sets.

5. The method of claim 1, wherein the second node j includes a random neighbor of the first node i.

6. The method of claim 1, wherein generating the first time $t^i$ and the second time $t^j$, updating the first value set $v_i(t)$ and the second value set $v_j(t)$, updating the first collection of memory sets $m_{i,k}(t)$ and the second collection of memory sets $m_{j,k}(t)$, calculating the majority vote $\pi_1$, and calculating the rank set $\{\pi_k\}$ are iterated until a convergence is achieved.

7. The method of claim 1, wherein updating the first value set $v_i(t)$, updating the second value set $v_j(t)$, updating the first collection of memory sets $m_{i,k}(t)$, and updating the second collection of memory sets $m_{j,k}(t)$ includes a procedure defined by the following:

```
If |v_i(t)| ≤ |v_j(t)| then
        v_i(t^i) := v_i(t) ∪ v_j(t), v_j(t^j) := v_i(t) ∩ v_j(t)
Else
        v_i(t^i) := v_i(t) ∩ v_j(t), v_j(t^j) := v_i(t) ∪ v_j(t)
End if
If v_i(t^i) ≠ ø then
        m_{i,|vi(t^i)|}(t^i) := v_i(t^i), m_{j,|vj(t^j)|}(t^j) := v_j(t^j)
End if
``` wherein
$v_i(t) \cup v_j(t)$ is a union set that includes the union of the first value set $v_i(t)$ and the second value set $v_j(t)$, $v_i(t) \cap v_j(t)$ is an intersection set that includes the intersection of the first value set $v_i(t)$ and the second value set $v_j(t)$,
the updated first memory set $m_{i,|vi(t^i)|}^i(t^i)$ is associated to the updated first size $|v_i(t^i)|$, and
the updated second memory set $m_{j,|vj(t^j)|}^j(t^j)$ is associated to the updated second size $|v_j(t^j)|$.

8. The method of claim 7, wherein the intersection set $v_i(t) \cap v_j(t)$ is replaced with the set of choices C if the intersection set $v_i(t) \cap v_j(t)$ is an empty set.

9. The method of claim 7, wherein the updated first memory set $m_{i,|vi(t^i)|}^i(t^i)$ is replaced with a set having one random element from the updated first value set $v_i(t^i)$ if the updated first memory set $m_{i,|vi(t^i)|}^i(t^i)$ is not a subset of the updated first value set $v_i(t^i)$.

10. The method of claim 7, wherein updating the first collection of memory sets $m_{i,k}(t)$ and updating the second collection of memory sets $m_{j,k}(t)$ further include a procedure defined by the following:

```
If |v_i(t^i)| > 1 and |v_j(t^j)| > 1 then
generate a random variable u from Bernoulli distribution with success probability 0.5
        If u = 1 then
                m_{i,k}(t^i) := m_{j,k}(t)
        Else
                m_{j,k}(t^j) := m_{i,k}(t)
        End if
End if
``` wherein $m_{i,k}(t^i)$ is an updated first collection of memory sets and $m_{j,k}(t^j)$ is an updated second collection of memory sets.

11. The method of claim 1, wherein calculating the majority vote $\pi_1$ comprises setting the majority vote $\pi_1$ equal to the updated first memory set $m_{i,|vi(t^i)|}^i(t^i)$ responsive to the updated first size $|v_i(t^i)|$ becoming equal to one.

12. A method for state-optimal ranking in a network with a plurality of nodes associated to a set of choices C $\{c_1, \ldots, c_k, \ldots, c_n\}$, the method comprising:
setting a plurality of ordered sets for the plurality of nodes at a moment t, including a first ordered set $a_i(t)$ for a first node i and a second ordered set $a_j(t)$ for a second node j, setting the plurality of ordered sets comprising:
initializing the first ordered set $a_i(t)$'s first entry at an initial moment $t_0$ with the first node i's preferred element from the set of choices C, and initializing the first ordered set $a_i(t)$'s other entries at the initial moment $t_0$ with an arbitrary permutation of other elements that excludes the first node i's preferred element from the set of choices C;
initializing the second ordered set $a_j(t)$'s first entry with the second node j's preferred element from the set of choices C, and initializing the second ordered set $a_j(t)$'s other entries at the initial moment to with an arbitrary permutation of other elements that excludes the second node j's preferred element from the set of choices C;
initializing a first pointer $p_i(t)$ at the initial moment $t_0$ to one, wherein the first pointer $p_i(t)$ includes an integer number; and
initializing a second pointer $p_j(t)$ at the initial moment $t_0$ to one, wherein the second pointer $p_j(t)$ includes an integer number that is equal or larger than the first pointer $p_i(t)$;
generating a first time $t^i$ for the first node i and a second time $t^j$ for the second node j;
updating the first ordered set $a_i(t)$ at the first time $t^i$ and updating the second ordered set $a_j(t)$ at the second time $t^j$ according to a plurality of permutation sets, to obtain an updated first ordered set $a_i(t^i)$ and an updated second ordered set $a_j(t^j)$; and
calculating a rank set $\{\pi_k\}$ for the set of choices C according to one of the updated first ordered set $a_i(t^i)$ or the updated second ordered set $a_j(t^j)$.

13. The method of claim 12, wherein the second node j includes a random neighbor of the first node i.

14. The method of claim 12, wherein the moment t comprises the initial moment $t_0$ or a moment after the initial moment $t_0$, and the first time $t^i$ and the second time $t^j$ are generated after the moment t.

15. The method of claim 12, wherein generating the first time $t^i$ and the second time $t^j$, updating the first ordered set $a_i(t)$, updating the second ordered set $a_j(t)$ and calculating the rank set $\{\pi_k\}$ are iterated until a convergence is achieved.

16. The method of claim 12, wherein updating the first ordered set $a_i(t)$ and updating the second ordered set $a_j(t)$ include operations defined by the following:

$a_i(t^i) := \{\Pi_1(t), \Pi_2(t), \Pi_3(t)\}$, $a_j(t^j) := \{\Pi_4(t), \Pi_5(t), \Pi_6(t)\}$;
wherein
$\Pi_1(t)$ is a first permutation set that includes a permutation of an intersection set $A_1$ that preserves the order of entries in accordance with the first ordered set $a_i(t)$, $\Pi_2(t)$ is a second permutation set that includes a permutation of the set-theoretic difference of a union set $A_2$ and the intersection set $A_1$ that preserves the order of entries in accordance with the first ordered set $a_i(t)$, $\Pi_3(t)$ is a third permutation set that includes a permutation of the set-theoretic difference of the set of choices C and the union set $A_2$ that preserves the order of entries in accordance with the first ordered set $a_i(t)$, $\Pi_4(t)$ is a fourth permutation set that includes a permutation of the intersection set $A_1$ that preserves the order of entries in accordance with the second ordered set $a_j(t)$, $\Pi_5(t)$ is a fifth permutation set that includes a permutation of the set-theoretic difference of the union set $A_2$ and the intersection set $A_1$ that preserves the order of entries in accordance with the second ordered set $a_j(t)$, and $\Pi_6(t)$ is a sixth permutation set that includes a permutation of the set-theoretic difference of the set of choices C and the union set $A_2$ that preserves the order of entries in accordance with the second ordered set $a_j(t)$.

17. The method of claim 16, wherein calculating the intersection set $A_1$ and the union set $A_2$ includes operations defined by the following:

$A_1 = a_i^{1:p_i(t)} \cap a_j^{1:p_j(t)}$, $A_2 = a_i^{1:p_i(t)} \cup a_j^{1:p_j(t)}$ wherein $a_i^{1:p_i(t)}$ includes a permutation of the first ordered set $a_i(t)$ that comprises the first $p_i(t)$ entries of the first ordered set $a_i(t)$, and $a_j^{1:p_j(t)}$ includes a permutation of the second ordered set $a_j(t)$ that comprises the first $p_j(t)$ entries of the second ordered set $a_j(t)$.

18. The method of claim 16, wherein updating the first ordered set $a_i(t)$ and updating the second ordered set $a_j(t)$ further includes updating the first pointer $p_i(t)$ and the second pointer $p_j(t)$ according to operations defined by the following:

$p_i(t') = |A_2|$, $p_j(t') = |A_1|$;

wherein $|A_1|$ is the intersection set $A_1$'s size, $|A_2|$ is the union set $A_2$'s size, $p_i(t')$ is an updated first pointer and $p_j(t')$ is an updated second pointer.

19. The method of claim 12, wherein calculating the rank set $\{\pi_k\}$ comprises setting the rank set $\{\pi_k\}$ equal to one of the updated first ordered set $a_i(t')$ or the updated second ordered set $a_j(t')$.

* * * * *